Figure 1:
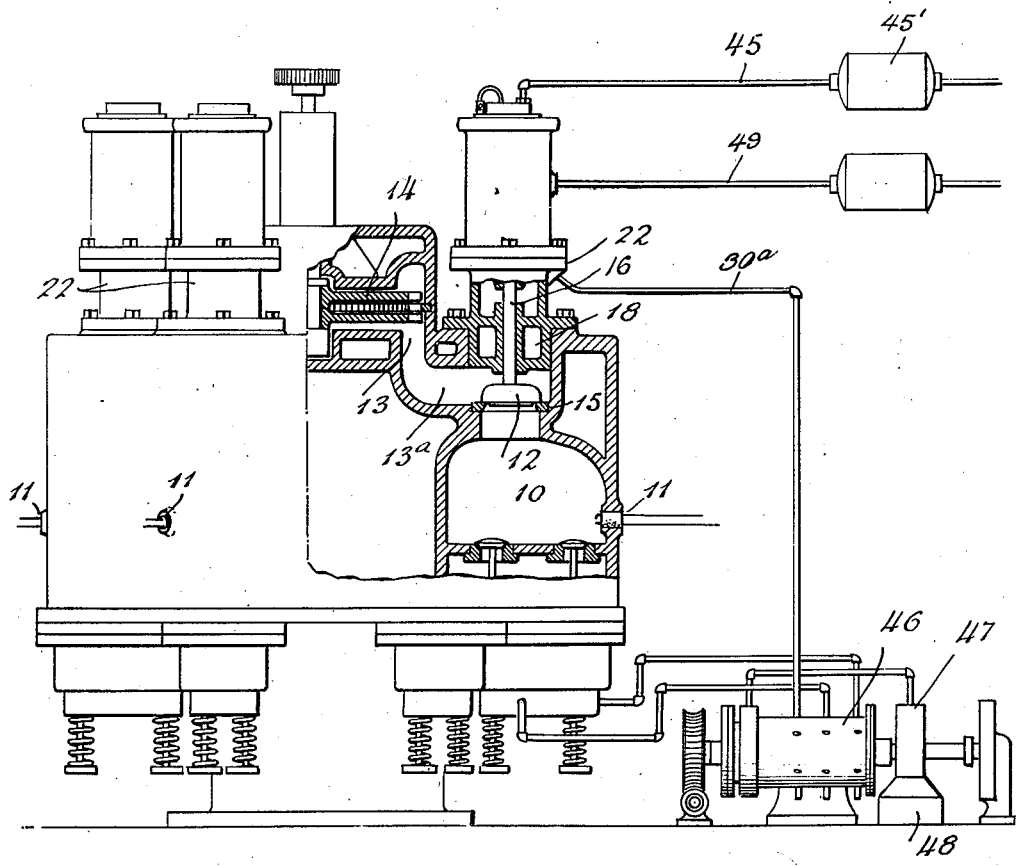

Jan. 29, 1929.　　　　　　　　　　　　　　　　　　1,700,700
H. HOLZWARTH
NOZZLE VALVE FOR INTERNAL COMBUSTION TURBINES
Filed Nov. 8, 1926　　　2 Sheets-Sheet 1

INVENTOR
HANS HOLZWARTH
ATTORNEYS

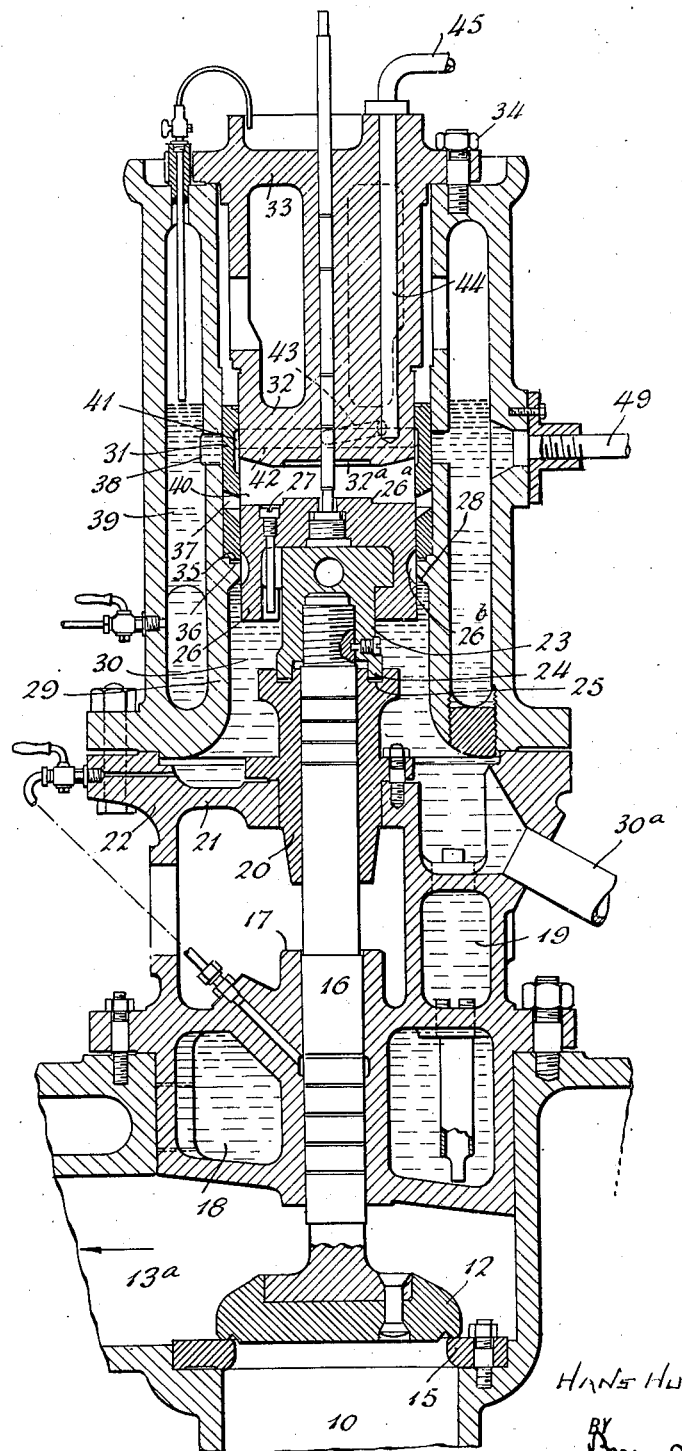

Patented Jan. 29, 1929.

1,700,700

UNITED STATES PATENT OFFICE.

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE.

NOZZLE VALVE FOR INTERNAL-COMBUSTION TURBINES.

Application filed November 8, 1926. Serial No. 146,928.

My invention relates to internal combustion turbines of the type shown for instance in my Patent No. 877,194 of January 21, 1908, and has for its object to provide a nozzle valve or combustion valve of novel construction whereby the connection between the combustion chamber and the nozzle for directing exploded gases against the initial member of the rotor of the engine to operate the same is controlled in a positive and efficient manner and in which the use of springs or corresponding elements is entirely avoided. Other more specific objects of the invention will appear from the description hereinafter.

In the accompanying drawings, which illustrate an example of the invention without defining its limits, Fig. 1 is a diagrammatic side elevation of an internal combustion turbine with the invention incorporated therein and Fig. 2 is a fragmentary vertical section of the valve on an enlarged scale.

Internal combustion turbines of the indicated type comprise a circular series of combustion chambers 10 in which the fuel is exploded in succession, for instance by electrically operated igniting devices 11 of suitable form. As the explosion takes place in a given chamber 10 it blows or forces open a nozzle or combustion valve 12 and the expanding products of the explosion, jet through a nozzle 13 under high pressure and are directed against the initial member of the rotor 14 of the engine to operate the same. The engine may be of any conventional construction and may include any features commonly found therein, the engine itself constituting no part of the present invention. After the valve 12 has been blow to its open position by the force of the explosion its closing is retarded to an extent sufficient to permit the constantly decreasing pressure of the exploded gases to effectively jet through the nozzle and so as to permit an incoming charge of fresh air to blow out and scavenge the combustion chamber in the customary way. It will be understood that these operative steps take place in proper sequence in the various combustion chambers of the turbine to bring about the desired operation thereof. Heretofore complicated arrangements have been required to properly retard the closing of the nozzle valve and springs have been utilized to properly seat said valves in their closed positions. In the present nozzle valve construction this complication and the use of springs or the like is entirely done away with.

As shown in Fig. 2 the valve 12, in its closed position, rests upon a seat 15 to securely close the communication between the combustion chamber 10 and the passage 13ª which terminates in the nozzle 13, for instance as illustrated in Fig. 1; it will be understood that corresponding arrangements are present in connection with all of the combustion chambers of the engines. For the sake of clearness and to avoid repetitions, one unit of the engine will be described throughout the specification.

The valve 12 is carried by a stem 16 which is guided in its vertically sliding movements in a sleeve 17 comprising part of the engine and surrounded by a chamber 18 in which a cooling fluid such as water is circulated, the chamber 18 being connected with an auxiliary chamber 19 which in turn is in connection with a source of cooling fluid. The valve stem 16 further extends slidably through a tubular guide 20 supported upon a transverse wall 21 of the valve casing 22, as shown in Fig. 2, and at its upper end carries a member 23 having an annular depending flange 24 arranged to extend into an annular recess 25 formed in the guide 20 for the purpose to be described more fully hereinafter. The member 23 constitutes a coupling whereby the valve 12 is connected with a piston 26; for instance the member 23 and the piston 26 may be connected with each other by means of a bayonet connection, in which case a lock screw 27 may be provided in the piston 26 to prevent relative rotation of the member 23 and its disconnection from the piston 26. The latter is slidably mounted in an annular rib 28 projecting inwardly from the casing 29 which forms part of the valve casing 22 as shown in Fig. 2; the annular rib 28, the casing 29, and the transverse wall 21 define a main inner chamber 30 into which the guide 20 and the piston 26 project; this chamber also surrounding the member 23 with which the stem 16 is connected. The piston 26 further slides within a sleeve valve 31 which is slidably mounted upon the inner surface of the casing 29 and upon the downwardly projecting extension 32 of the cover 33 which is removably fixed upon the casing 29 in any suitable manner as by means of bolts 34. The sleeve valve 31 is located above the rib 28 and is provided with an annular depending shoulder 35 arranged to project into an annular recess 36 of the rib 28 for the purpose to be more fully set forth hereinafter.

The sleeve valve 31 furthermore is provided with openings 37 which preferably incline downwardly in an inward direction and in one position of the sleeve valve 31 register with openings 38 which communicate with an outer chamber 39 formed in the casing 29 as shown in Fig. 2, and thereby serve to connect this outer chamber 39 with a secondary inner chamber 40 formed between the top of the piston 26 and the inner end of the downwardly projecting extension 32 of the cover 33. The piston 26 at its upper surface is provided with a projection 26$^a$ adapted to extend into a recess 32$^a$ formed on the lower face of the extension 32 for the purpose to be set forth more fully hereinafter. In addition, the piston 26 is formed with a peripheral channel 26$^b$ adapted in the closed position of the valve to register with the rib 28 and to extend beyond the same upon opposite sides thereof, as shown in Fig. 2. The sleeve valve 31 upon its inner surface is provided with an annular channel 41 adapted to bring about a communication between a channel 42 formed in the extension 32 and the chamber 40 and to disconnect the same in the operation of the device. The channel 42 is connected by means of a passage 43 with a channel 44 which in turn is connected through the medium of a pipe 45 with a high pressure medium which in the preferred form is a source of oil under high pressure such as an accumulator 45′ in which a constant pressure may be maintained by any suitable pump, not illustrated in the drawings. The chamber 30 is connected by means of a suitable pipe 30$^a$ with a controlling device which in the illustrated example is an oil controller 46 of the type described in my aforementioned Patent No. 877,194 of January 21, 1908. The controller is connected with an oil pump 47 of any conventional type or its equivalent and itself connected with a suitable source of oil supply 48 or other suitable medium; the controller and the oil pump as well as the source of oil supply, which may be a tank, are shown diagrammatically in Fig. 1 of the drawing. The oil pump maintains a constant oil pressure of a medium amount, for instance, 8 atmospheres within a revolver rotating within the controller. This pressure is brought to act temporarily upon the mechanism of the various nozzle valves in succession as the rotation of the revolver brings the conduits 30$^a$ into communication with the interior of the revolver. As the revolver passes beyond the position in which such communication exists, the conduits 30$^a$ are brought in communication with a non-pressure space arranged within the controller cylinder and are thus relieved of the oil pressure. As the controller is described and illustrated in the aforementioned patent, a detailed description may be dispensed with.

In the drawings the valve 12 is shown in its closed position in which it must, in order to provide efficient operation, securely seal the connection between the combustion chamber 10 and the passage 13$^a$ which leads to the nozzle 13. It will be understood that the chamber 39 in the operative condition of the valve contains oil under a low pressure of for example 2 atmospheres which pressure is continuous and remains substantially unchanged at any time. In the embodiment represented the chamber 39 is connected by means of a conduit 49 with an accumulator containing oil under a pressure of 2 atmospheres. The pressure may be maintained within the accumulator by a suitable pump, not shown in the drawings. An air cushion is formed in the chamber 39 above the oil contained therein. At the same time the channel 42 contains oil which is continually under the high pressure of for example 30 atmospheres, this oil thus comprising a high pressure medium the purpose of which will be described further on in the specification. In the normal closed position of the valve, the chamber 30 contains oil which is practically under no pressure but which, during the period in which the valve 12 occupies its open position, is placed under the aforementioned medium a pressure of for example 8 atmospheres. In the operation of the turbine, the pressures developed upon the valve 12 during the compression and explosion of the fuel in the combustion chamber 10 operate against the pressure of the oil in the channel 42 which is effective in the chamber 40 because, as shown in Fig. 2, the slide valve 31 is in a position to establish communication through the medium of its channel 41 between said chamber 40 and the channel 42; the high pressure oil which exerts a presssure of for instance 30 atmospheres, is therefore effective upon the upper surface of the piston 26. This pressure is sufficient to prevent the valve 12 from being opened by the pressure exerted thereon during the compression of the fuel in the combustion chamber. At the proper time, the oil controller 46 will bring the pump 47 into communication with the chamber 30 to thereby raise the pressure of the oil in the chamber 30 to approximately 8 atmospheres. In the period of time during which the oil distributor 46 completes the connection between the chamber 30 and the oil pump 47, the slide valve 31 will be shifted upwardly by the action of the developed oil pressure of 8 atmospheres in the chamber 30 upon the lower end surface of the valve 31 through the peripheral channel 26$^b$ of the piston 26 and the annular recess 36 to thereby break the connection between the channel 42 and the chamber 40. At this stage the piston 26 is accordingly no longer subjected to the downward pressure of the high pressure oil in the channel 42. When this condition is reached, an explosion of the fuel in the chamber 10 takes place and creates an upward pressure of approximately 16 atmospheres upon the valve 12. The latter is accordingly shifted to its open position to permit the exploded gases to reach the channel 13ª and the nozzle 13 and to be directed thereby against the initial member of the rotor 14 of the turbine. While the upward throw of the valve is brought about with great force, its upward movement is cushioned because of the fact that the oil in the chamber 40 must be forced into the chamber 39; this operation is possible because of the fact that the previously mentioned upward movement of the slide valve 31 has brought its openings 37 into registry with the openings 38 to thereby bring the chambers 40 and 39 into communication with each other. As the piston 26 approaches its final upward position, a small quantity of oil is trapped in the recess 32ª and in being forced therefrom by the projection 26ª of the piston serves to cushion the final movements of said piston and to prevent injury thereto or to the adjacent elements. As long as the oil in the chamber 30 is maintained under a pressure of for example 8 atmospheres, that is, as long as the oil distributor 46 maintains the connection between said chamber 30 and the oil pump 47, the slide valve 31 and with it the piston 26 and valve 12 will remain in a raised position; this is due to the fact that the pressure of the oil in the chamber 30 is exerted in an upward direction upon the piston 26 and upon the slide valve 31. The valve 12 is thus maintained in its open position for a period of time sufficient to permit the constantly decreasing pressure of the exploded gases to effectively jet through the nozzle 13 and to permit an incoming charge of fresh air to blow out and scavenge the combustion chamber 10 in the usual way.

The moment the connection between the chamber 30 and the oil pump 47 is broken by the oil distributor 46, the pressure of the oil in the chamber 30 will be reduced to practically zero (gauge), and the valve 12 will be closed or returned to its seat 15 by the low pressure of the oil in the chamber 39 which at this stage is effective in the chamber 40 and is therefore exerted in a downward direction upon the piston 26. As the piston 26 and with it the valve 12 thus move downwardly, the slide valve 31 is held in its upper most position in which the openings 37 establish communication between the chambers 39 and 40, by the oil which is trapped beneath the slide valve 31 between the piston 26 and the inner surface of the casing 29. As the piston 26 approaches its lowermost position, the space beneath the slide valve 31 will be brought into communication with the chamber 30 by the annular channel 26ᵇ of said piston and thus permit the aforesaid oil to flow from beneath said slide valve 31 into the chamber 30. The oil in the chambers 39 and 40 which is under a pressure of approximately 2 atmospheres being effective upon said slide valve 31, the latter will be moved in a downward direction back to its original position in which the chamber 40 is again in communication with the channel 42 through the medium of the recess 41 so that the valve 12 is firmly held upon its seat 15 by the approximately 30 atmospheres pressure of the high pressure oil which now again fills the chamber 40, and is effective upon the upper surface of the piston 26. The downward movement of the valve 12 and its associated parts is cushioned by the oil which is trapped in the recess 25 of the guide member 20 and which acts upon the annular flange 24 of the connecting member 23.

The valve is extremely simple in construction and efficient in operation and is operated and controlled entirely by oil or other fluid pressure and avoids the necessity for the use of springs or other similar elements. The arrangement is such that the valve may be opened at any predetermined moment, that is, either after the completion of an explosion or at the moment at which the greatest part of the fuel mixture has been burned, or at any other predetermined moment. With the construction illustrated and described, the diameters of the explosion chambers with respect to the smallest cross-sectional area of the nozzle are such that transitory and successive explosions take place in the explosion chambers under a predetermined fixed pressure.

Various changes in the specific form shown and described may be made within the scope of the claims without departing from the spirit of my invention.

I claim:

1. In an internal combustion turbine, the combination of a fuel-nozzle valve, a valve casing provided with an outer chamber containing oil under a constant low pressure, said casing being further provided with a main inner chamber containing oil which is under practically no pressure when said nozzle valve is closed, and with a secondary inner chamber, a source of oil under a medium pressure, means connecting the same with said main inner chamber temporarily for the period during which said nozzle valve is to be opened, a piston connected with said valve and constituting a dividing wall between said two inner chambers, and movable relatively thereto, a source of oil under a constant high pressure, a first conduit from said high pressure source to said secondary chamber, a second conduit connecting said outer chamber with said secondary chamber, a slide valve controlling said conduits and subjected to and actuated by the oil pressure prevailing in said main inner chamber to place said secondary inner chamber in alternate communication with said high pressure source and said outer chamber, whereby the piston is alternately subjected to, and relieved from the action of the high pressure oil to maintain the fuel valve in its closed position during the compression of the fuel in the combustion chamber and to permit the valve to be opened and to be kept open as a result of the subsequent explosion and of the action of the medium pressure temporarily prevailing in said main inner chamber.

2. In an internal combustion turbine of the type in which a fuel charge explodes within a chamber closed by a poppet valve controlling the admission of the combustion gases to a turbine nozzle and arranged to open in the direction of the explosion gas pressure, the combination of said valve, a cylinder, a piston arranged therein and connected with said valve, a source of low pressure oil having a communication with the one end of said cylinder to act on said piston from above for moving said valve from its open into its closed position, a source of high pressure oil having a communication with the same side of said cylinder for maintaining said valve in its closed position, a reciprocating slide valve controlling said communications to subject said piston alternately to said low pressure and to said high pressure, a source of medium pressure oil having a communication with the other end of said cylinder to act on said piston from below, and means controlling said last named communication to admit said medium pressure for a part of the period during which said low pressure is active on said piston, whereby the valve is opened when the piston is relieved from said high pressure, is held open by the action of said medium pressure oil, is closed by the action of said low pressure oil and is kept in closed position against the force of explosion by the action of the high pressure oil.

3. In an internal combustion turbine, the combination of a rotor, an explosion chamber, a nozzle for directing the explosion gases against said rotor, a channel leading from said chamber to said nozzle, a valve controlling said channel and seating toward the explosion chamber, a piston connected with said valve, a cylinder in which said piston is movable, a source of high pressure fluid, a source of low pressure fluid, a controlling valve for connecting said sources alternately with said cylinder on the valve-closing side of the piston, a source of medium pressure fluid, and a controller for connecting the cylinder on the other side of the piston, with said last mentioned source of fluid while the other side is exposed to the low pressure.

In testimony whereof, I have hereunto set my hand.

HANS HOLZWARTH.